United States Patent
Hern et al.

(10) Patent No.: US 10,801,760 B2
(45) Date of Patent: Oct. 13, 2020

(54) ELECTRONIC EXPANSION VALVE (EEV) CONTROL SYSTEM AND METHOD

(71) Applicant: Johnson Controls Technology Company, Milwaukee, WI (US)

(72) Inventors: Shawn A. Hern, Park City, KS (US); Brian D. Rigg, Douglass, KS (US); Jeffrey N. Nichols, Wichita, KS (US); Robert L. Eskew, Kingman, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 140 days.

(21) Appl. No.: 15/660,798

(22) Filed: Jul. 26, 2017

(65) Prior Publication Data

US 2018/0031288 A1    Feb. 1, 2018

Related U.S. Application Data

(60) Provisional application No. 62/367,277, filed on Jul. 27, 2016, provisional application No. 62/367,294, filed on Jul. 27, 2016.

(51) Int. Cl.
*F25B 41/06* (2006.01)
*F25B 29/00* (2006.01)

(52) U.S. Cl.
CPC .......... *F25B 41/062* (2013.01); *F25B 29/003* (2013.01); *F25B 2341/0653* (2013.01); *F25B 2600/21* (2013.01); *F25B 2600/2513* (2013.01); *F25B 2700/197* (2013.01); *F25B 2700/2104* (2013.01); *F25B 2700/21175* (2013.01)

(58) Field of Classification Search
CPC ........ F25B 29/03; F25B 30/02; F25B 41/062; F25B 2600/21; F25B 2600/2513; F25B 2700/197; F25B 2700/2103; F25B 2700/2104; F25B 2700/2117; F25B 2700/21175
See application file for complete search history.

(56) References Cited

U.S. PATENT DOCUMENTS

| | | | |
|---|---|---|---|
| 6,082,128 A | 7/2000 | Lake et al. | |
| 7,784,296 B2 * | 8/2010 | Chen | F25B 41/062 62/157 |
| 8,881,541 B2 | 11/2014 | Noll et al. | |
| 9,151,526 B2 | 10/2015 | Qu et al. | |

(Continued)

*Primary Examiner* — Eric S Ruppert
*Assistant Examiner* — Hans R Weiland
(74) *Attorney, Agent, or Firm* — Fletcher Yoder, P.C.

(57) ABSTRACT

Systems and methods to control an electronic expansion valve (EEV) of a vapor compression system are described. A heating ventilation, and air conditioning (HVAC) system includes control circuitry having a sensor. The control circuitry sets a control setpoint of a vapor compression system such that an electronic expansion valve operates across a first operating range. The control circuitry receives a signal from the sensor indicative of an operating condition of the vapor compression system. The control circuitry adjusts the control setpoint based at least in part on the operating condition. The control circuitry controls operation of the electronic expansion valve based at least in part on the adjusted control setpoint, wherein the electronic expansion valve operates across a second operating range, different from the first operating range, at the adjusted control setpoint.

15 Claims, 7 Drawing Sheets

(56) References Cited

U.S. PATENT DOCUMENTS

| | | | |
|---|---|---|---|
| 2004/0068999 A1* | 4/2004 | Jessen | F25B 49/02 62/222 |
| 2009/0031740 A1* | 2/2009 | Douglas | F25B 41/062 62/225 |
| 2011/0023515 A1 | 2/2011 | Kopko et al. | |
| 2012/0266623 A1* | 10/2012 | Patel | F25B 41/062 62/225 |
| 2015/0027139 A1* | 1/2015 | Lin | F25B 49/02 62/56 |
| 2016/0200176 A1 | 7/2016 | Stanke et al. | |

* cited by examiner

ELECTRONIC EXPANSION VALVE (EEV) CONTROL SYSTEM AND METHOD

CROSS REFERENCE TO RELATED APPLICATIONS

This application claims priority from and the benefit of U.S. Provisional Application Ser. No. 62/367,294, entitled "NESTED FEEDBACK EEV CONTROL ALGORITHM," filed Jul. 27, 2016, and U.S. Provisional Application No. 62/367,277, entitled "MICROCHANNEL EEV CONTROL ALGORITHM", filed Jul. 27, 2016, which are both herein incorporated by reference in their entirety for all purposes.

BACKGROUND

The present disclosure relates generally to heating, ventilating, and air conditioning systems. Specifically, the present disclosure relates to systems and methods for controlling an electronic expansion valve (EEV) in a vapor compression system.

A wide range of applications exists for heating, ventilation, and air conditioning (HVAC) systems. For example, residential, commercial, and industrial systems are used to control temperatures and air in residences and buildings using a fluid, such as a refrigerant. The HVAC systems may circulate the refrigerant through a closed loop between an evaporator where the refrigerant absorbs heat and a condenser where the refrigerant releases heat. As an example, the refrigerant may absorb heat from a first location and expel the heat in a second location to cool the first location. The refrigerant may be evaporated into a vapor by the evaporator that absorbs the heat from the first location. The compressor may then compress the vapor to cause the pressure and/or temperature of the vapor to rise for subsequent cooling at the second location, thereby moving heat from the first location to the second location.

The HVAC system may include an electronic expansion valve (EEV) that controls flow of the refrigerant from the condenser into the evaporator. By regulating the flow of the refrigerant into the evaporator, the EEV may control superheat at the outlet of the compressor to ensure that the refrigerant is evaporated before returning to the compressor. However, the amount of refrigerant controlled by the EEV may result in nuisance tripping and instabilities in the HVAC system.

BRIEF SUMMARY

In one embodiment, a heating ventilation, and air conditioning (HVAC) system includes control circuitry having a sensor, wherein the control circuitry sets a control setpoint of a vapor compression system such that an electronic expansion valve operates across a first operating range, receives a signal from the sensor indicative of an operating condition of the vapor compression system, adjusts the control setpoint based at least in part on the operating condition, and controls operation of the electronic expansion valve based at least in part on the adjusted control setpoint, wherein the electronic expansion valve operates across a second operating range, different from the first operating range, at the adjusted control setpoint.

In another embodiment, a control system for a heating, ventilation, and air conditioning (HVAC) system includes control circuitry, the control circuitry including a first feedback loop that receives a first signal from a first sensor indicative of a first operating condition of a vapor compression system and determines a control setpoint of a second operating condition of the vapor compression system, and a second feedback loop nested within the first feedback loop, such that the control setpoint of the second operating condition is an input to the second feedback loop, wherein the second feedback loop receives a second signal from a second sensor indicative of the second operating condition of the vapor compression system, and outputs a third signal to control operation of an electronic expansion valve (EEV) of the vapor compression system based at least in part on the first operating condition and the second operating condition.

In another embodiment, a vapor compression system includes a condenser configured to condense a refrigerant from a gaseous state into a liquid state, an evaporator configured to evaporate the refrigerant from the liquid state into the gaseous state, an electronic expansion valve (EEV) configured to control flow of the refrigerant between the condenser and the evaporator, and control circuitry including a first sensor configured to detect a first operating condition of the vapor compression system, a second sensor configured to detect a second operating condition of the vapor compression system, a first feedback loop that receives a first signal from the first sensor indicative of feedback related to the first operating condition and determines a control setpoint of the second operating condition based at least in part on the feedback relating to the first operating condition, and a second feedback loop nested within the first feedback loop such that the control setpoint of the second operating condition is an input to the second feedback loop, wherein the second feedback loop receives a second signal from the second sensor indicative of the second operating condition of the vapor compression system, and controls operation of the EEV based at least in part on the first operating condition and the second operating condition, wherein the control circuitry is configured to adjust a control setpoint associated with the first operating condition.

DETAILED DESCRIPTION

The present disclosure is directed to a control system and method for an electronic expansion valve (EEV) that regulates refrigerant expansion in a vapor compression system. Refrigeration systems typically include a condenser and an evaporator. The EEV controls the flow of refrigerant from the condenser to the evaporator. The total amount of refrigerant may be referred to as a charge level.

A control system of the EEV may control operation of the EEV to control the flow of the refrigerant from the condenser to the evaporator based on a control setpoint. The control setpoint may be a desired or target setting of an operating condition of the vapor compression system, such as a desired temperature, a desired pressure, desired superheat, a desired subcooling, or the like. However, an optimum setting at which to set the control setpoint may vary depending on operating conditions of the vapor compression system. Further, incorrectly setting the control setpoint may cause nuisance tripping and/or instability of the system depending on the operating conditions. For example, a control setpoint may be initially set to a desired temperature or superheat at the outlet of the evaporator to be 10° Fahrenheit at an outdoor ambient temperature of 95° Fahrenheit. As outdoor ambient temperatures increase, a lower superheat, and a lower control setpoint, may be desired to reduce or prevent a decrease in an effective heat transfer surface of the condenser and to reduce or prevent an increase in the system discharge pressure. Because a lower superheat is desired, the optimal operating range of the EEV may be where the valve operates at a more opened operating range than the initial operating range of the EEV. That is, the optimal operating range of the EEV may correspond to a lower control setpoint of superheat than the initial control setpoint in high ambient temperatures. Similarly, as outdoor ambient temperatures drop, a higher optimum control setpoint of superheat may be desired to reduce or prevent instability in the evaporator. As such, the optimal operating range of the EEV may where the valve operates at a less opened operating range than the initial operating range of the EEV to reduce the flow of the refrigerant through the EEV, which increases the superheat to be at a higher temperature.

Moreover, microchannel coils may have a higher sensitivity to the changes in ambient temperatures due to smaller channel sizes interacting with the ambient temperatures. As such, microchannel coils may be prone to nuisance tripping and/or instability due to ambient changes. Nuisance tripping and instability may be exacerbated in multi-speed systems that change mass flow and optimal charge levels further.

As described below, the control system may adjust the control setpoint based on one or more operating conditions of the vapor compression system to reduce or eliminate nuisance tripping and improve stability in the system. The control system may include one or more sensors, such as a pressure sensor and/or a temperature sensor, which detect the one or more operating conditions of the vapor compression system. For example, a temperature sensor may be configured to detect an ambient temperature of the outdoor air. The control system may adjust the control setpoint during operation of the vapor compression system to a different control setpoint based on the ambient temperature. For instance, at lower ambient temperatures than normal, such as at lower ambient temperatures than room temperature, the control system may send a signal to a motor of the control system to cause the EEV to close further than normal. Similarly, at higher ambient conditions than normal, such as at higher ambient temperatures than room temperature, the control system may send a signal to the motor of the control system to cause the EEV to open further than normal. By adjusting the EEV to different control setpoints during operation, the control system may allow the vapor compression system to remain stable in a wider range of operating conditions that change during operation of the vapor compression system than an EEV system that does not account for changes in operating conditions. While ambient temperature is provided as an example of the operating condition, any suitable operating condition may be used. For instance, the control system may monitor temperature and pressure at an outlet of the evaporator to determine superheat of the refrigerant.

Often a single feedback loop is used for control. Single feedback loops may be limited in controlling the EEV. As such, an additional feedback may be added to the control system to control operation of the EEV based on the additional input from sensor data. However, the control system may lose stability due to the feedback loop and the additional feedback loop fighting for control in operating the EEV.

In some embodiments, the control system may include a first feedback loop that controls the EEV position based on a first operating parameter and a second feedback loop that controls the EEV position based on a second operating parameter to more accurately control the EEV. The control system may include a cascading control process in which the second feedback loop is nested within the first feedback loop. That is, the first feedback loop may output a signal as a control setpoint of the second feedback loop. As an example, the first feedback loop may be controlled using temperature as the feedback data, and the second feedback loop may be controlled using pressure as the feedback data. A response time of pressure sensors may be faster than a response time of temperature sensors. In some cases, the response time difference between two sensor may be due to temperature changing at a slower rate than pressure, or in other cases, it may be due to the sensor operating at a slower rate. Regardless, because of the response time difference, the control system may use a cascading control process such that the sensor data from the sensor with the faster response time may be used to repeatedly to control the EEV position over a single response of the temperature sensor. Further, by using the output of the first feedback loop as an input for the second feedback loop, the control system accounts for change in either the first operating parameter or the second operating parameter to better adjust the EEV position.

Figure 1:
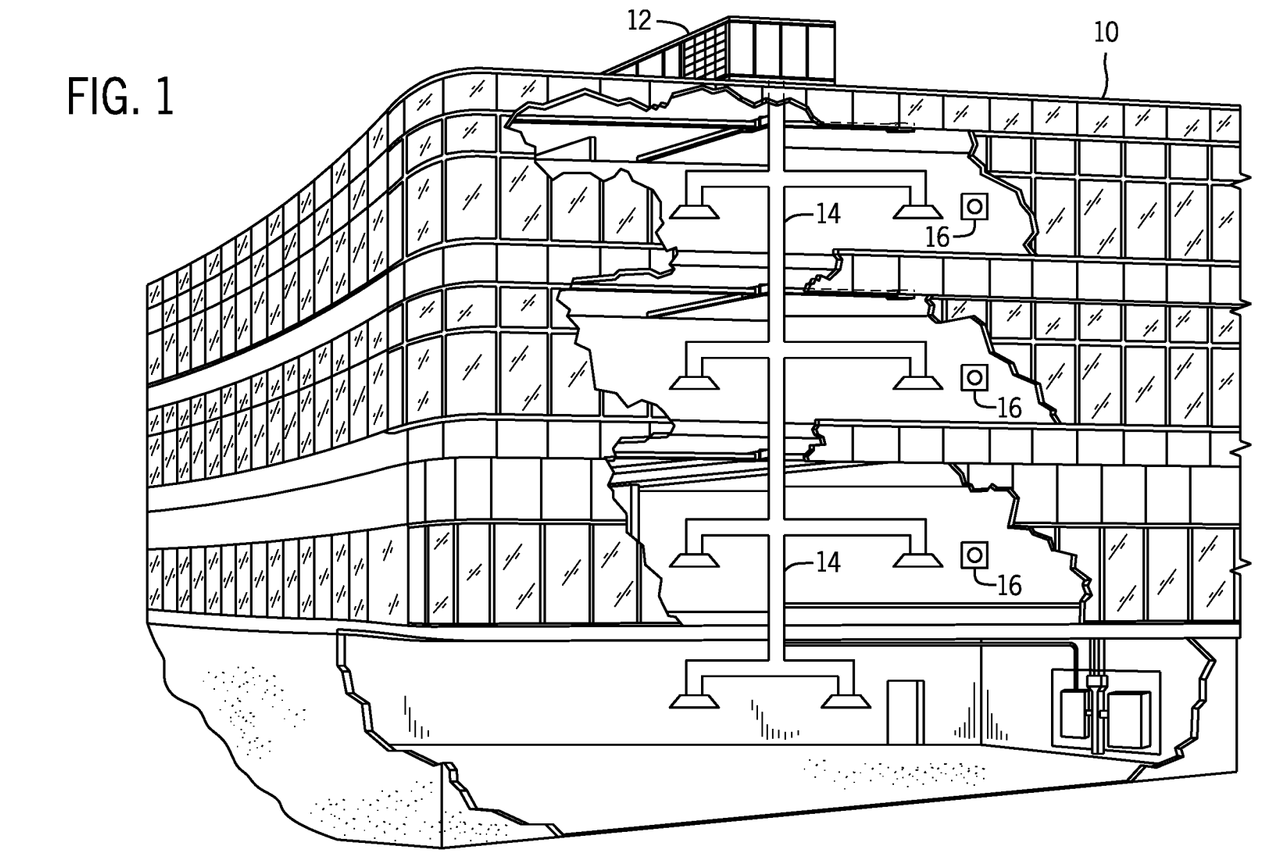
FIG. 1 illustrates a heating, ventilating, and air conditioning (HVAC) system for building environmental management that may employ one or more HVAC units, in accordance with an embodiment of the present disclosure.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
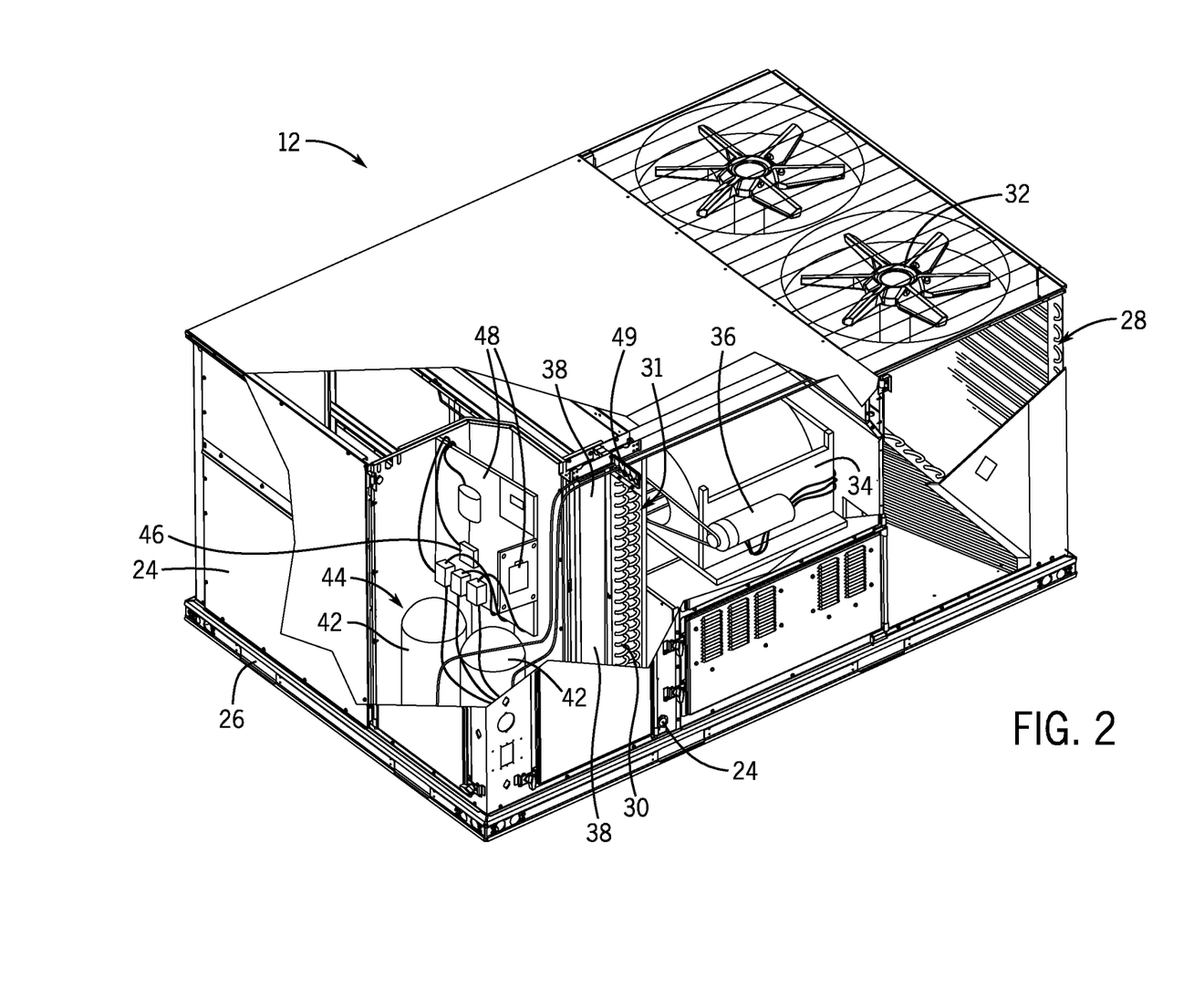
FIG. 2 is a perspective view of an HVAC unit of the HVAC system of FIG. 1, in accordance with an embodiment of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits.

Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
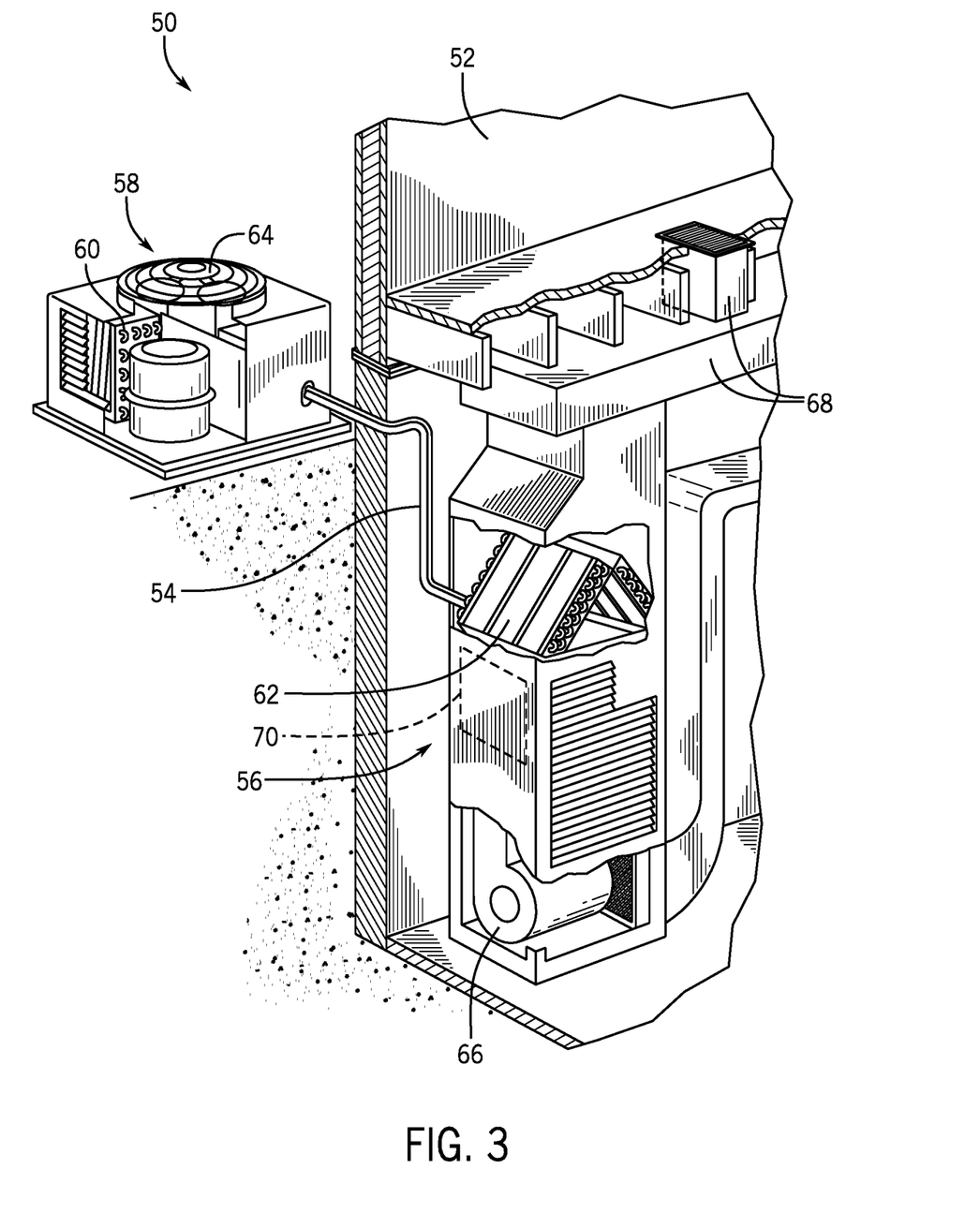
FIG. 3 illustrates a residential heating and cooling system, in accordance with an embodiment of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
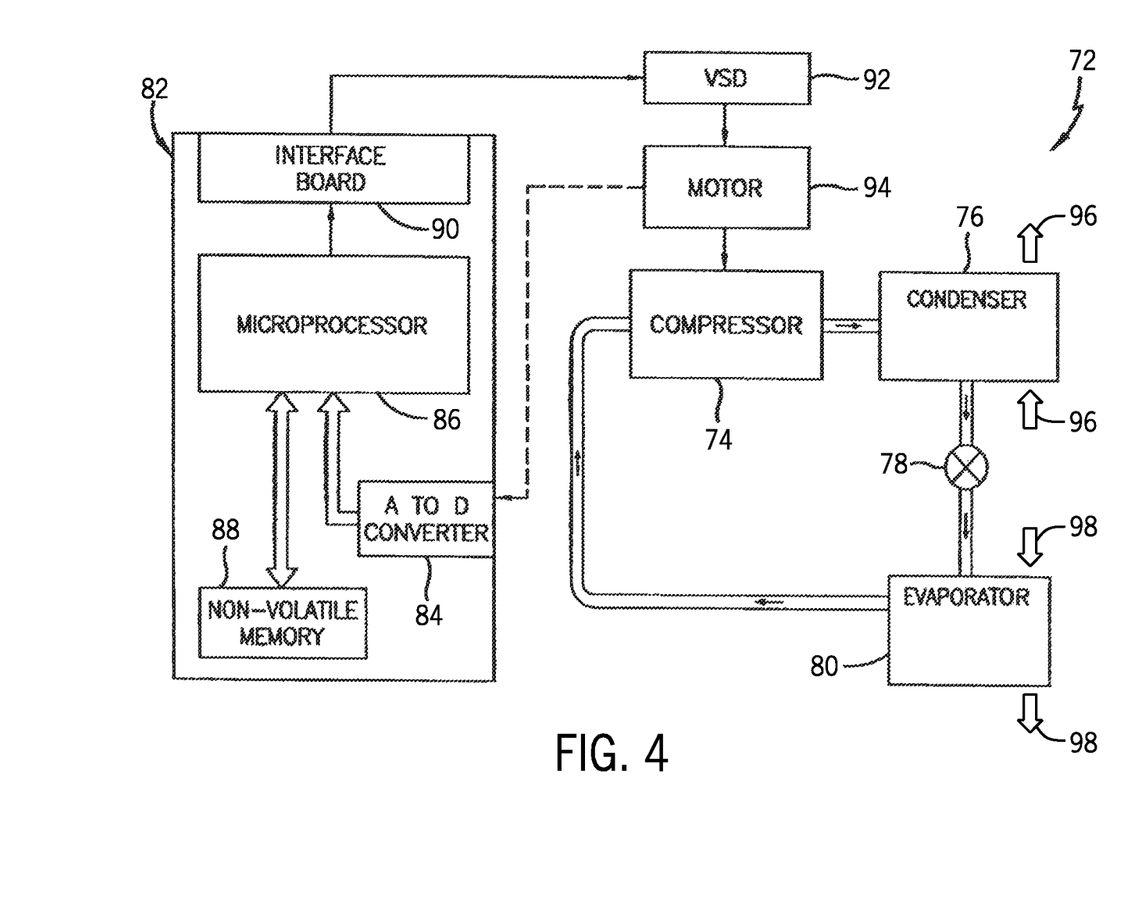
FIG. 4 illustrates a vapor compression system that may be used in the HVAC system of FIG. 1 and in the residential heating and cooling system of FIG. 3, in accordance with an embodiment of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

In some embodiments, the expansion device 78 may be an electronic expansion valve (EEV). As described below, the EEV 78 may control the flow of the refrigerant from the condenser 76 to the evaporator 80. As described below, a control system may be used to control operation of the EEV 78 to obtain the desired flow of refrigerant between the condenser 76 and the evaporator 80.

Figure 5:
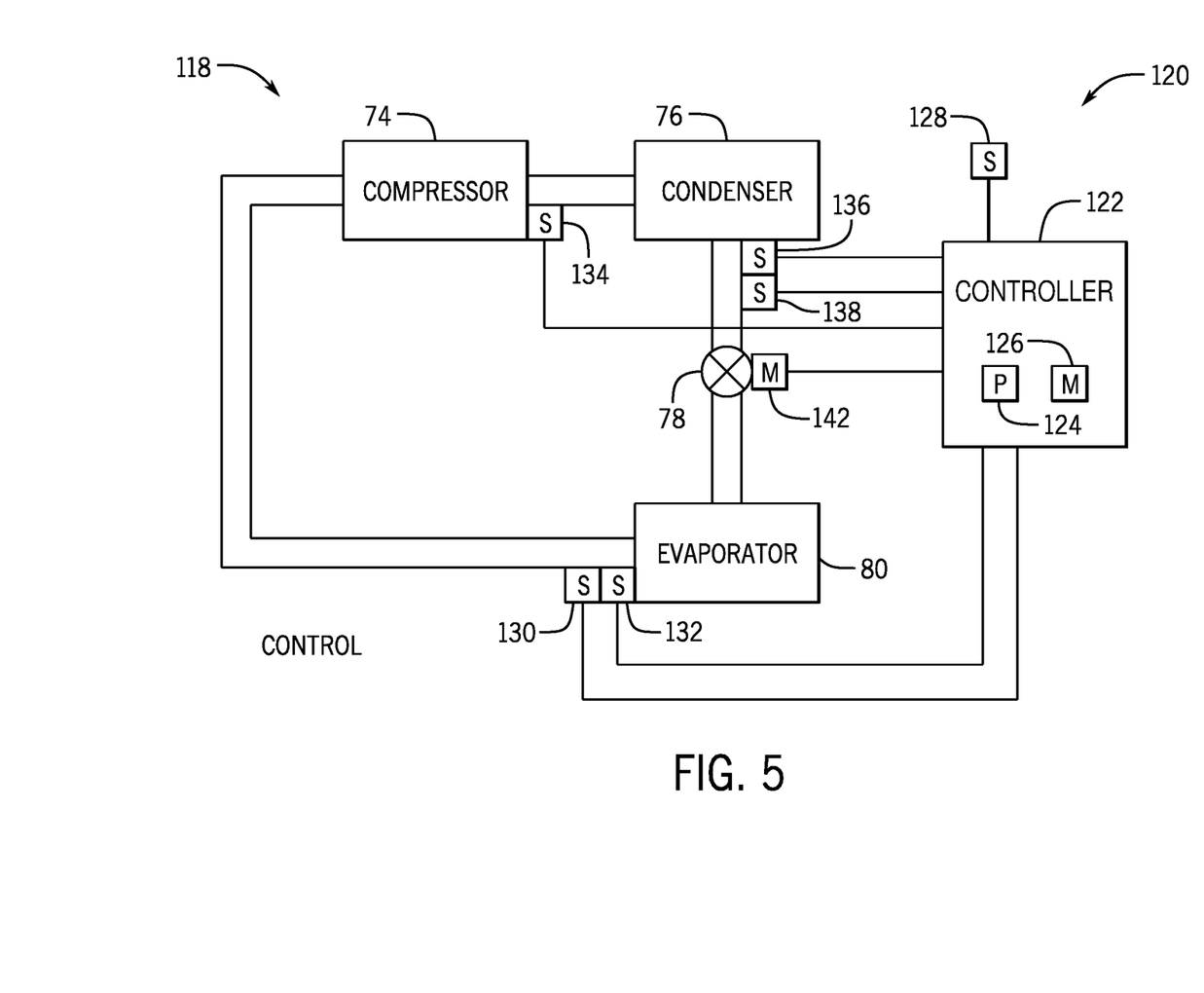
FIG. 5 illustrates a control system that may be used in the vapor compression system of FIG. 4, in accordance with an embodiment of the present disclosure.

FIG. 5 illustrates a control system 118 that may be used to control operation of the EEV 78 in the vapor compression system 72 described in FIG. 4. The EEV 78 may operate across an operating range based on a control setpoint set by control circuitry 120. For example, the EEV 78 may operate across a range of positions during operation of the vapor compression system 72 such that a midpoint of the operating range of the EEV 78 corresponds to the control setpoint of superheat. That is, the control circuitry 120 may control operation of the EEV 78 to obtain a flow of refrigerant that causes the desired superheat of the control setpoint at the outlet of the evaporator 80. The control circuitry may include a controller 122, such as a microcontroller. The controller 122 may include a processor 124 operatively coupled to memory 126 to execute software, such as software for controlling a position of the EEV 78. Moreover, the processor 124 may include multiple processors, one or more "general-purpose" microprocessors, one or more special-purpose microprocessors, and/or one or more application specific integrated circuits (ASICS), or some combination thereof. For example, the processor 124 may include one or more reduced instruction set (RISC) processor, advanced RISC machine (ARM) processor, performance optimization with enhanced RISC (PowerPC) processor, field-programmable gate array (FPGA) integrated circuit, graphics processing unit (GPU), or any other suitable processing device.

The memory 126 may include a volatile memory, such as random access memory (RAM), nonvolatile memory, such as read-only memory (ROM), flash memory, or any combination thereof. The memory 126 may store a variety of information that may be used for various purposes. For example, the memory 126 may store processor-executable instructions (e.g., firmware or software) for the processors 124 to execute, such as instructions for controlling the EEV 78.

The processor 124 may execute instructions to receive one or more signals from one or more sensors of the vapor compression system 72. For example, the control circuitry 120 may include sensors 128, 130, 132, 134, 136, and 138 positioned on or about various components of the vapor compression system 72. For instance, the control circuitry 120 may include a temperature sensor 130 and a pressure sensor 132 positioned on an outlet of the evaporator 80. The temperature sensor 130 may send a signal to the controller 122 indicating temperature of the refrigerant as the refrigerant leaves the evaporator 80. Similarly, the pressure sensor 132 may send a signal to the controller 122 indicating a pressure as the refrigerant leaves the evaporator 80. The processor 124 may receive each of the respective signals from the temperature sensor and the pressure sensor and determine a superheat of the refrigerant as the refrigerant leaves the evaporator 80, which indicates the amount of heat in the refrigerant with respect to a saturation point of the refrigerant. For instance, the processor 124 may determine the superheat by utilizing a lookup table stored in the memory 126 that defines a relationship of the superheat with respect to the temperature and the pressure at the outlet of the evaporator 80. The lookup table may be based on physical properties (e.g., saturation point, quantity, etc.) of the refrigerant.

Additionally and/or alternatively, the processor 124 may determine subcooling of the refrigerant. For example, the control circuitry 120 may include a temperature sensor 126 and a pressure sensor 138 on an outlet of the condenser 76. The processor 124 may receive a signal indicative of temperature of the refrigerant at the outlet of the condenser 76 from the temperature sensor 136 and receive a signal indicative of a pressure of the refrigerant at the outlet of the condenser 76. Similar to determining the superheat, the processor 124 may determine subcooling by utilizing a lookup table that defines a relationship of the subcooling of the refrigerant with respect the temperature and the pressure at the outlet of the condenser 76. The lookup table may be based on physical properties of the refrigerant.

In some embodiments, an ambient temperature sensor 128 may be positioned proximate to the vapor compression system 72 to detect temperature of the surrounding air. As another example, a temperature sensor 134 may be positioned at an outlet of the compressor 74 to detect temperature of the refrigerant after the compressor 74 compresses the refrigerant. While the sensors 128, 130, 132, 134, 136, and 138 are described in detail, any suitable sensors that detect operating conditions of the vapor compression system 72 may be used.

The processor 124 may receive one or more signals indicating operating conditions (e.g., temperature, pressure, vibrations, etc.) of the vapor compression system 72. The processor 124 may determine a difference between a control setpoint of a desired operating condition and actual operating conditions of the vapor compression system 72 from feedback received by the one or more sensors 128, 130, 132, 134, 136, and 138. For example, the processor 124 may determine a difference between a desired superheat of the refrigerant as the refrigerant leaves the evaporator 80 and measured superheat of the refrigerant as the refrigerant leaves the evaporator 80.

The processor 124 may adjust the EEV 78 based on the difference between the control setpoint of the desired superheat and the measured superheat of the refrigerant as the refrigerant leaves the evaporator 80. For example, if superheat of 10 degrees above the saturation point of the refrigerant is desired and measured temperatures and pressures indicate a superheat of 5 degrees, the processor 124 may send a signal to the motor 142, such as a stepper motor, to control a position of the EEV 78 to close the EEV 78 to limit refrigerant passing to the evaporator to cause an increase in the superheat of the refrigerant. The controller 122 may include a proportional-integral-derivative (PID) controller, fuzzy logic controller, or any other suitable controller 122 to adjust the EEV 78 to reduce the difference between the control setpoint and the measured operating conditions of the vapor compression system 72.

By controlling the position of the EEV 78 according to the control setpoint and feedback from the sensors 128, 130, 132, 134, 136, and 138, the processor 124 may control the position of the EEV 78 across an initial operating range. For instance, the processor 124 may set a superheat in the vapor compression system 72 to be at approximately 10 degrees Fahrenheit as the control setpoint. To maintain the refrigerant at the desired 10 degrees as the refrigerant leaves the evaporator, the processor 124 may control the position of the EEV 78 across an operating range of 40 to 60 percent closed. In this example, the control setpoint of 10 degrees may cause the control circuitry 120 to control the position of the EEV 78 to be approximately at a midpoint of 50 percent with variances depending on the superheat feedback. As operating conditions of the vapor compression system 72 change over time, the optimal control setpoint may vary. For example, as the outdoor ambient temperature decreases, the optimal amount of superheat may increase. Further, as outdoor ambient temperatures increase, the optimal amount of superheat may decrease.

To obtain the optimal amount of superheat in the vapor compression system 72 in a variety of operating conditions, the processor 124 may adjust the control setpoint based on feedback received by the one or more sensors 128, 130, 132, 134, 136, and 138. In the above example, the processor 124 may receive a signal indicative of an ambient temperature from the temperature sensor 128. During operation of the vapor compression system 72, the processor 124 may adjust the control setpoint based on the feedback from the ambient temperature sensor 128. If the ambient temperatures decrease, the processor 124 may adjust the control setpoint such that the position of the EEV 78 operates across an operating range of 20 to 40 percent closed. That is, the control circuitry 120 may control the position of the EEV 78 to be approximately at the midpoint of 30 percent closed with variances of plus or minus ten percent across the operating range depending on the superheat feedback. By adjusting the control setpoint, the EEV 78 may provide an increased charge level, or subcooling, into the condenser 76 while operating at temperatures lower than a normal temperature, such as room temperature, to maintain stability of the system 72.

Similarly, if the ambient temperatures increase, the processor 124 may adjust the control setpoint such that the position of the EEV 78 operates across an operating range of 60 to 80 percent closed. That is, the control circuitry 120 may control the position of the EEV 78 to be approximately at a midpoint of 70 percent between closed with variances of plus or minus ten percent depending on the superheat feedback. By adjusting the control setpoint, the EEV 78 may provide decreased amount of charge, or subcooling, into the to the condenser 76 while operating at temperatures higher than a normal temperature (e.g., ambient temperature) to maintain stability of the system. While percentages are used herein, these are simply meant to be illustrative as examples and any suitable operating ranges may be used.

By limiting the flow of the refrigerant from dynamically adjusting the control setpoint during operation of the vapor compression system 72, the EEV 78 may cause the refrigerant subcooling in the condenser to remain for an extended duration, or a shortened duration, than if the control setpoint was fixed during operation. For example, by having the refrigerant remain backed up in the condenser 76 for the extended duration, the refrigerant may be cooled to cooler temperatures by the condenser 76 than if the EEV 78 were to operate at a fixed setpoint. The additional cooling of the refrigerant in the condenser 76 due to the EEV 78 positioning results in cooler refrigerant flowing to the evaporator 80. That is, the temperature at the outlet of the evaporator 80, or the superheat, depends on the temperature of the refrigerant subcooling of the condenser 76. By controlling the EEV 78, the temperature of the refrigerant leaving the condenser 76 may be controlled to obtain the desired temperature at the outlet of the evaporator 80. As described below, the processor 124 may control the EEV 78 based on temperatures at the condenser 76 or the processor 124 may indirectly control the temperature at the evaporator 80 by controlling the refrigerant temperatures in the condenser 76 via adjusting the EEV 78 position.

Figure 6:
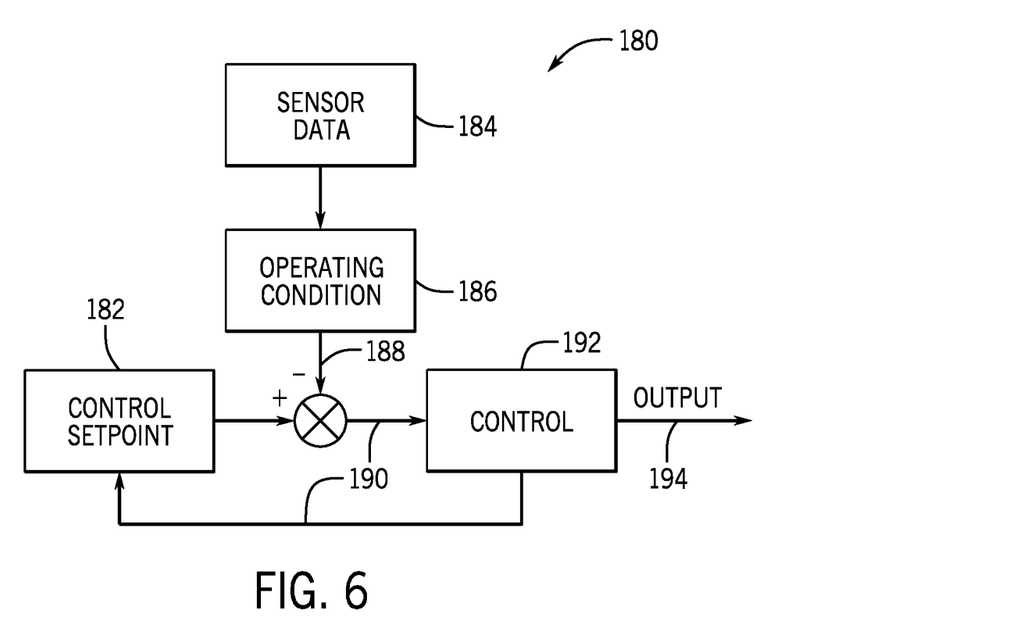
FIG. 6 is a schematic diagram of the control system of the HVAC of FIG. 5, in accordance with an aspect of the present disclosure.

FIG. 6 is a block diagram of a control system 180 that adjusts the control setpoint such that the EEV 78 operates across an operating range based on operating conditions of the vapor compression system 72. The control system 180 may include the control circuitry 120, such as the sensors, motor, and controller described above, and may perform the steps described below via the hardware and/or software, such as instructions stored in the memory 126. In the control system 180, the control circuitry 120 may receive an initial control setpoint 182. The control circuitry 120 receives one or more signals, such as sensor data 184, from one or more sensors, such as the one or more sensors 128, 130, 132, 134, 136, and 138. For example, the processor 124 may receive a signal indicative of a temperature of the refrigerant and a signal indicative of a pressure of the refrigerant from the temperature sensor 130 and pressure sensor 132, respectively. The control circuitry 120 may determine one or more operating conditions 186 of the vapor compression system 72, such as one or more temperatures, pressures, superheat, subcooling, or the like. For example, the temperature and pressure may be used by the processor 124 to determine an amount of superheat 188 associated with that temperature and pressure. In some embodiments, the processor 124 may determine the superheat 188 via a lookup table of values based on the properties of the refrigerant. The control circuitry 120 may compare feedback of the superheat 188 with the control setpoint 182 to determine a difference 190 between a desired superheat and the measured superheat 188 from the feedback. While superheat is used herein as an example, any suitable operating condition may be used, such as subcooling. The control circuitry 120 may then control 192 operation of the EEV 78 to adjust the superheat at the outlet of the evaporator 80 to reduce the difference 190 between the control setpoint 182 and the superheat feedback 188. For example, the processor 124 may determine a position at which to adjust the EEV 78 based on the difference 190. The control circuitry 120 may output a signal 194 to the motor 142 to control operation of the motor 142 based upon the determined position. While a motor is used in this example, any suitable method to control the EEV 78 into position may be used.

To account for operating conditions of the vapor compression system 72, the control circuitry 120 may determine an adjustment 190 at which to adjust the control setpoint 182. For example, the processor 124 may increase or decrease the control setpoint 182 stored in the memory 126 depending on whether ambient temperatures have increased or decreased to adjust the operating range of the EEV 78. That is, upon determining the operating conditions 186 of the vapor compression system 72, the processor 124 may adjust the control setpoint 182 such that EEV 78 of the vapor compression system 72 operates across operating ranges suitable for the operating conditions 186. By accounting for the operating conditions 186 in the control setpoint 182, the control system 180 may reduce or eliminate nuisance tripping as well as reduce or eliminate instability issues within the vapor compression system 72.

Figure 7:
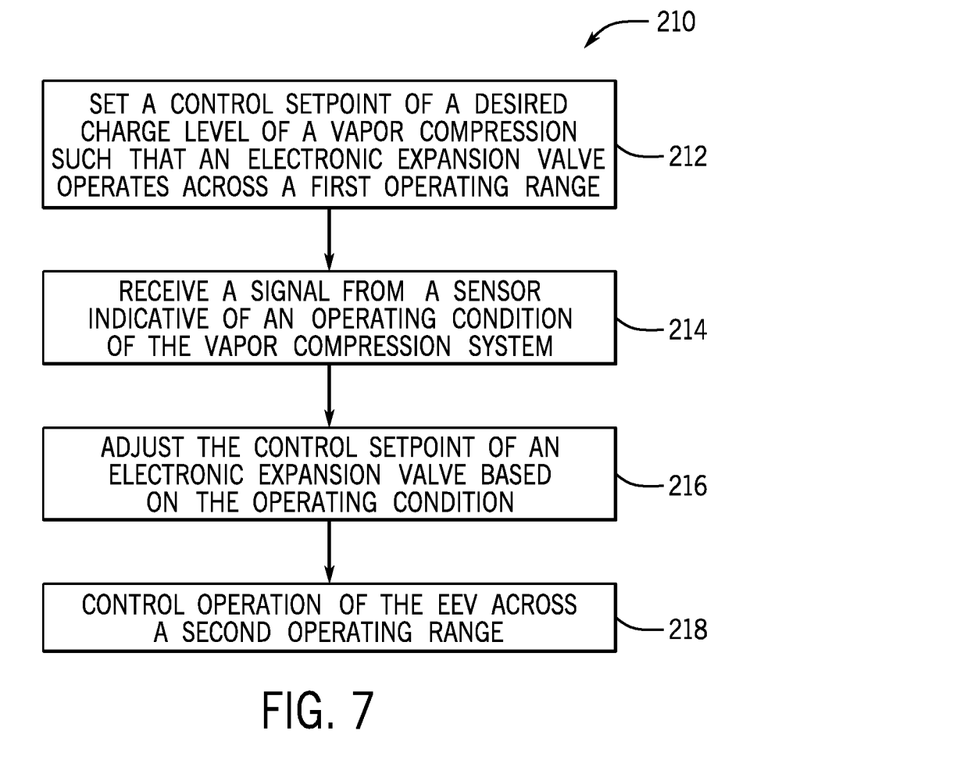
FIG. 7 is a flow diagram of a process performed by the control system of FIG. 5, in accordance with an aspect of the present disclosure.

FIG. 7 is a flow diagram of a process 210 performed by the control circuitry 120 of FIG. 5. The process 210 may be stored in the memory 126 of the control circuitry 120 and executed as instructions by the processor 124. The processor 124 may begin by setting a control setpoint of a desired superheat, or a desired charge level, of the vapor compression system 72 such that the EEV 78 operates across a first operating range (block 212). The processor 124 receives a signal from one or more of the sensors 128, 130, 132, 134, 136, and 138 indicative of an operating condition, such as superheat, ambient temperatures, subcooling, or any combination thereof, of the vapor compression system 72 (block 214). The processor 124 may then adjust the control setpoint of the EEV 78 based on the operating condition (block 216). The control setpoint may be mechanically or electrically set to the desired superheat that causes the EEV 78 to control the amount of refrigerant flowing from the condenser 76 to the evaporator 80 to properly condense into a liquid at the condenser 76 without causing the liquid to back up in the condenser 76. As mentioned above, the processor 124 may adjust the control setpoint stored in the memory 126. The processor 124 then controls operation of the EEV 78 across a second operating range (block 218).

As mentioned above, different sensor data may be received by the processor 124 at varying rates. For example, a response time of the pressure sensor 132 may be faster than a response time of the temperature sensor 130. That is, the pressure sensor 132 may detect changes in pressure at a faster rate than changes in temperature because of the type of sensors used and/or because temperatures may change at a slower rate than pressures.

Figure 8:
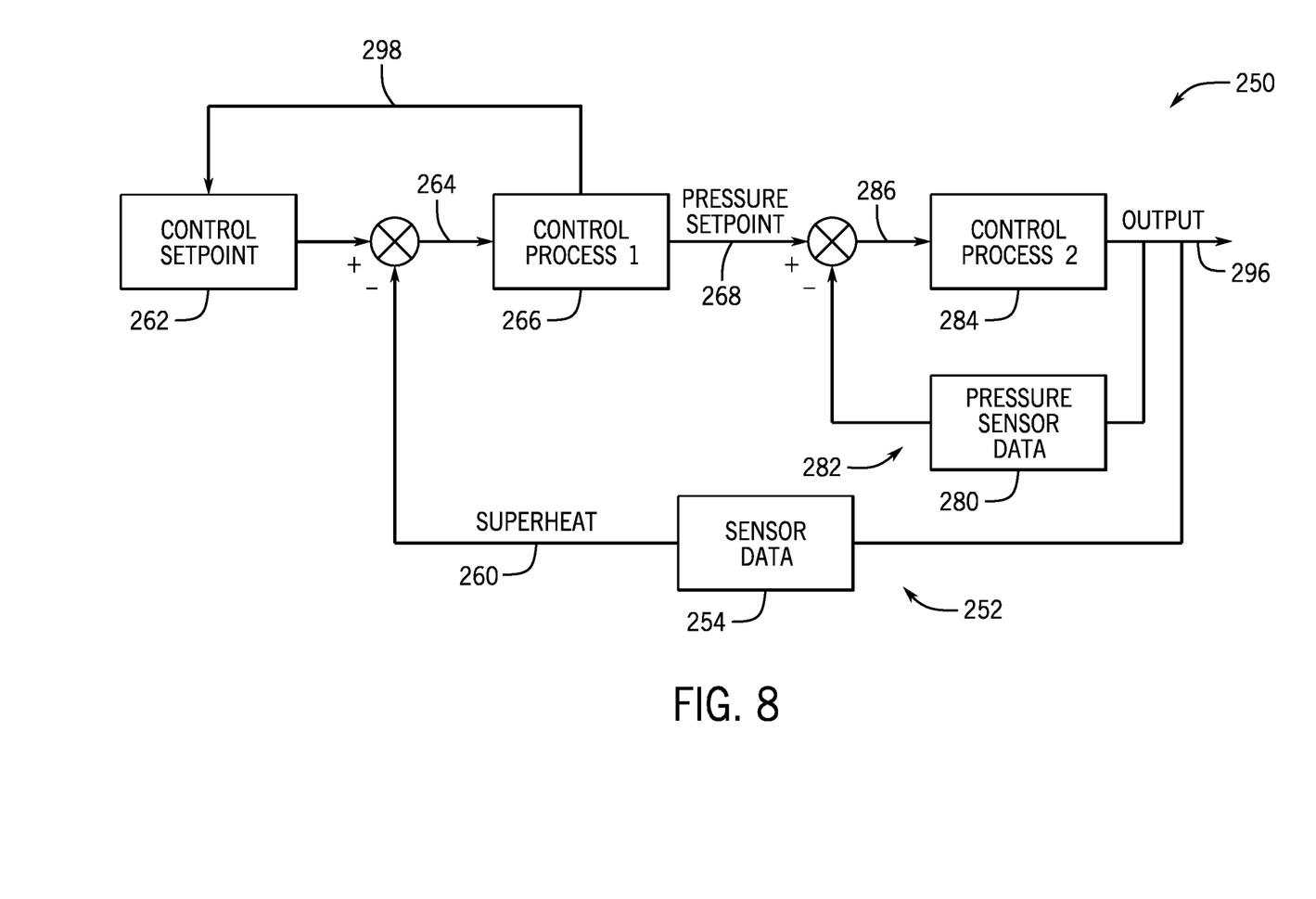
FIG. 8 is a schematic diagram of the control system of the HVAC of FIG. 5, in accordance with an aspect of the present disclosure.

FIG. 8 is a block diagram of a control system 250 that controls the EEV 78 using two feedback loops in a cascading control process. The control system 250 may include the control circuitry 120 to perform the steps described below in hardware and/or software. The control system 250 includes a first feedback loop 252, such as an outer loop, that provides superheat feedback 260 based on sensor data 254, such as the sensor data 184 as described above with respect to FIG. 6. The processor 124 may compare the superheat feedback 260 to a superheat control setpoint 262 to determine a first difference 264. The first difference 264 may be used in a first control process 266 to determine a pressure control setpoint 268. The processor 124 may compare the pressure control setpoint 268 to pressure feedback data 280 of a second feedback loop 282, such as an inner loop, to determine a second difference 286. The processor 124 may determine an output 296 to control operation of the EEV 78 in a manner that reduces each of the first difference 264 and the second difference 286. The first control process 266 and the second control process 284 may include processes performed by a proportional-integral-derivative PID controller, fuzzy logic controller, or the like. The processor 124 may output 296 a signal to control operation of the motor 142 based on the second difference 286 to reduce the difference between the measured pressure feedback data 280 and the pressure control setpoint 268 set by the first feedback loop 252.

As shown in FIG. 8, the second feedback loop 282 is nested within the first feedback loop 252 such that the output of the first feedback loop 252 is an input, such as the pressure control setpoint 268, of the second feedback loop 282. By nesting the second feedback loop 282 within the first feedback loop 252, instability of the control system 250 may be reduced due to each sensor data in the control system 250 not competing with one another for control over the EEV 78. Further, because the pressure feedback data 280 is updated more frequently due to a faster response time than the superheat feedback data 260, the control system 250 may provide outputs that reduce the differences 264 and 286 between the respective control setpoints 262 and 268 at a rate that may be faster than if the first feedback loop 252 and the second feedback loop 282 are competing for control. In other words, the processor 124 may repeatedly adjust the output to the motor 142 based on changes in pressure feedback data 280 for each change in superheat feedback data 260. In some embodiments, the processor 124 may also generate a signal 298 to update the control setpoint 262 based on the superheat feedback data 260 as described in conjunction with FIG. 6 above. For example, the processor 124 may adjust the control setpoint 262 based on ambient temperatures on or about the vapor compression system 72, superheat, or the like.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the embodiments, all features of an actual implementation may not have been described (i.e., those unrelated to the presently contemplated best mode of carrying out the disclosure, or those unrelated to enabling the claimed features). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A control system for a heating, ventilation, and/or air conditioning (HVAC) system, comprising:
   control circuitry, comprising:
      a first feedback loop configured to:
         receive a first signal from a first sensor indicative of feedback related to a first operating condition of a vapor compression system;
         determine a control setpoint of a second operating condition of the vapor compression system based on the feedback related to
         the first operating condition; and
      a second feedback loop nested within the first feedback loop, wherein the second feedback loop is configured to:
         receive the control setpoint of the second operating condition from the first feedback loop as an input to the second feedback loop;
         receive a second signal from a second sensor indicative of feedback related to the second operating condition of the vapor compression system; and
         determine a difference between the feedback related to the second operating condition and the control setpoint of the second operating condition received from the first feedback loop, wherein the control circuitry is configured to output a third signal to adjust a position of an electronic expansion valve (EEV) of the vapor compression system to decrease the difference between the feedback related to the second operating condition and the control setpoint of the second operating condition.

2. The control system of claim 1, wherein the first operating condition comprises ambient temperature and the second operating condition comprises pressure at an outlet of an evaporator of the HVAC system.

3. The control system of claim 1, wherein the first operating condition comprises superheat, wherein the superheat is determined based on temperature and pressure of a refrigerant at an outlet of an evaporator of the HVAC system.

4. The control system of claim 1, wherein the control circuitry is configured to adjust the position of the EEV to decrease the difference between the feedback related to the second operating condition and the control setpoint of the second operating condition via a Proportional-Integral-Derivative (PID) controller.

5. The control system of claim 1, wherein the second sensor is configured to generate the second signal multiple times for each generation of the first signal by the first sensor.

6. The control system of claim 1, wherein the control circuitry is configured to send a signal to a motor to adjust the position of the EEV based on the first operating condition and the second operating condition.

7. The system of claim 1, wherein the first operating condition comprises subcooling of a refrigerant at an outlet of a condenser of the HVAC system.

8. A vapor compression system, comprising:
a condenser configured to condense a refrigerant from a gaseous state into a liquid state;
an evaporator configured to evaporate the refrigerant from the liquid state into the gaseous state;
an electronic expansion valve (EEV) configured to control flow of the refrigerant between the condenser and the evaporator; and
control circuitry, comprising:
a first sensor configured to detect a first operating condition of the vapor compression system;
a second sensor configured to detect a second operating condition of the vapor compression system;
a first feedback loop configured to:
receive a first signal from the first sensor indicative of feedback related to the first operating condition; and
determine a control setpoint of the second operating condition based on the feedback related to the first operating condition; and
a second feedback loop nested within the first feedback loop, wherein the second feedback loop is configured to:
receive the control setpoint of the second operating condition from the first feedback loop as an input to the second feedback loop;
receive a second signal from the second sensor indicative of feedback related to the second operating condition of the vapor compression system; and
determine a difference between the feedback related to the second operating condition and the control setpoint of the second operating condition received from the first feedback loop; and
wherein the control circuitry is configured to:
generate a third signal to adjust a position of the EEV to decrease the difference between the feedback related to the second operating condition and the control setpoint of the second operating condition; and
adjust a control setpoint of the first operating condition based on a third operating condition of the vapor compression system.

9. The vapor compression system of claim 8, comprising a motor configured to receive the third signal from the control circuitry and to adjust the position of the EEV based on the third signal.

10. The vapor compression system of claim 8, wherein the first operating condition comprises superheat of the refrigerant at an outlet of the evaporator and the second operating condition comprises pressure at the outlet of the evaporator.

11. The vapor compression system of claim 8, wherein the control circuitry is configured to:
receive the control setpoint of the first operating condition, wherein the third operating condition is an ambient temperature surrounding the vapor compression system.

12. The vapor compression system of claim 11, wherein the control circuitry is configured to control the EEV to operate across a different operating range upon adjusting the control setpoint of the first operating condition.

13. The vapor compression system of claim 8, comprising a microchannel coil configured to condense the refrigerant of the vapor compression system.

14. The vapor compression system of claim 8, wherein the first feedback loop is configured to determine a difference between the feedback related to the first operating condition and the control setpoint of the first operating condition, and wherein the control circuitry is configured to generate a fourth signal to adjust the position of the EEV to decrease the difference between the feedback related to the first operating condition and the control setpoint of the first operating condition.

15. The vapor compression system of claim 14, wherein the control circuitry is configured to generate the third signal multiple times for each generation of the fourth signal.

* * * * *